United States Patent
Soerensen et al.

(10) Patent No.: US 7,166,022 B2
(45) Date of Patent: Jan. 23, 2007

(54) SUCTION HEAD FOR CLEANING OF THE SURFACE OF CARCASS PARTS

(75) Inventors: Jens Joerren Soerensen, Koebenhavn S (DK); Jens Teilmann, Roskilde (DK); Helge Moeller, Charlottenlund (DK)

(73) Assignee: Slagteriernes Forskningsinstitut, Roskilde (DK)

( * ) Notice: Subject to any disclaimer, the term of this patent is extended or adjusted under 35 U.S.C. 154(b) by 170 days.

(21) Appl. No.: 10/489,761

(22) PCT Filed: Sep. 18, 2002

(86) PCT No.: PCT/DK02/00602

§ 371 (c)(1),
(2), (4) Date: Aug. 16, 2004

(87) PCT Pub. No.: WO03/026432

PCT Pub. Date: Apr. 3, 2003

(65) Prior Publication Data

US 2006/0178102 A1 Aug. 10, 2006

(30) Foreign Application Priority Data

Sep. 26, 2001 (DK) ............................... 2001 01400

(51) Int. Cl.
*A22C 18/00* (2006.01)
(52) U.S. Cl. .................................................. 452/123
(58) Field of Classification Search .............. 15/405, 15/345, 300.1, 302; 452/123
See application file for complete search history.

(56) References Cited

U.S. PATENT DOCUMENTS

| 787,388 | A | * | 4/1905 | Moorhead | 15/345 |
| 787,389 | A | * | 4/1905 | Moorhead | 15/345 |
| 1,654,727 | A | * | 1/1928 | Green et al. | 15/345 |
| 2,012,640 | A | * | 8/1935 | Bennet | 15/346 |
| 2,226,630 | A | * | 12/1940 | McCord | 55/305 |
| 2,238,541 | A | * | 4/1941 | Spagnolo | 15/397 |
| 2,483,176 | A | * | 9/1949 | Bishop et al. | 451/90 |

(Continued)

FOREIGN PATENT DOCUMENTS

EP   0 679 335   2/1999

(Continued)

*Primary Examiner*—Thomas Price
(74) *Attorney, Agent, or Firm*—Marshall, Gerstein & Borun LLP

(57) ABSTRACT

A suction head for cleaning of the surface of carcass parts consists of an oblong handle (1) and a nozzle (3) mounted at one end of the handle. An air duct (6) passes through the handle and the nozzle, and it can be connected with a suction device via a coupling (5) in the other end of the handle. Steam ducts (10) are designed in the nozzle (3) to lead hot steam to the surface parts (11) of the nozzle, which are intended to get into contact with the surface of the carcass parts. These steam ducts (10) are connected with a supply duct (7), which is connected with a steam source via a coupling (8) on the suction head. The supply duct (7) for steam passes through the handle (1) from its coupling end to the suction device and to its nozzle end. In the nozzle the duct passes into the steam ducts (10). It is less fatiguing for an operator to use this suction head than a conventional head with disinfection facility.

11 Claims, 1 Drawing Sheet

U.S. PATENT DOCUMENTS

| | | |
|---|---|---|
| 5,503,594 A | 4/1996 | Karubian et al. |
| 5,607,349 A | 3/1997 | Karubian et al. |
| 5,632,670 A | 5/1997 | Gwyther |
| 6,243,915 B1 * | 6/2001 | Nakai et al. .................. 15/346 |

FOREIGN PATENT DOCUMENTS

| | | |
|---|---|---|
| WO | WO 97/15196 | 5/1997 |
| WO | WO 02/26045 | 4/2002 |

* cited by examiner

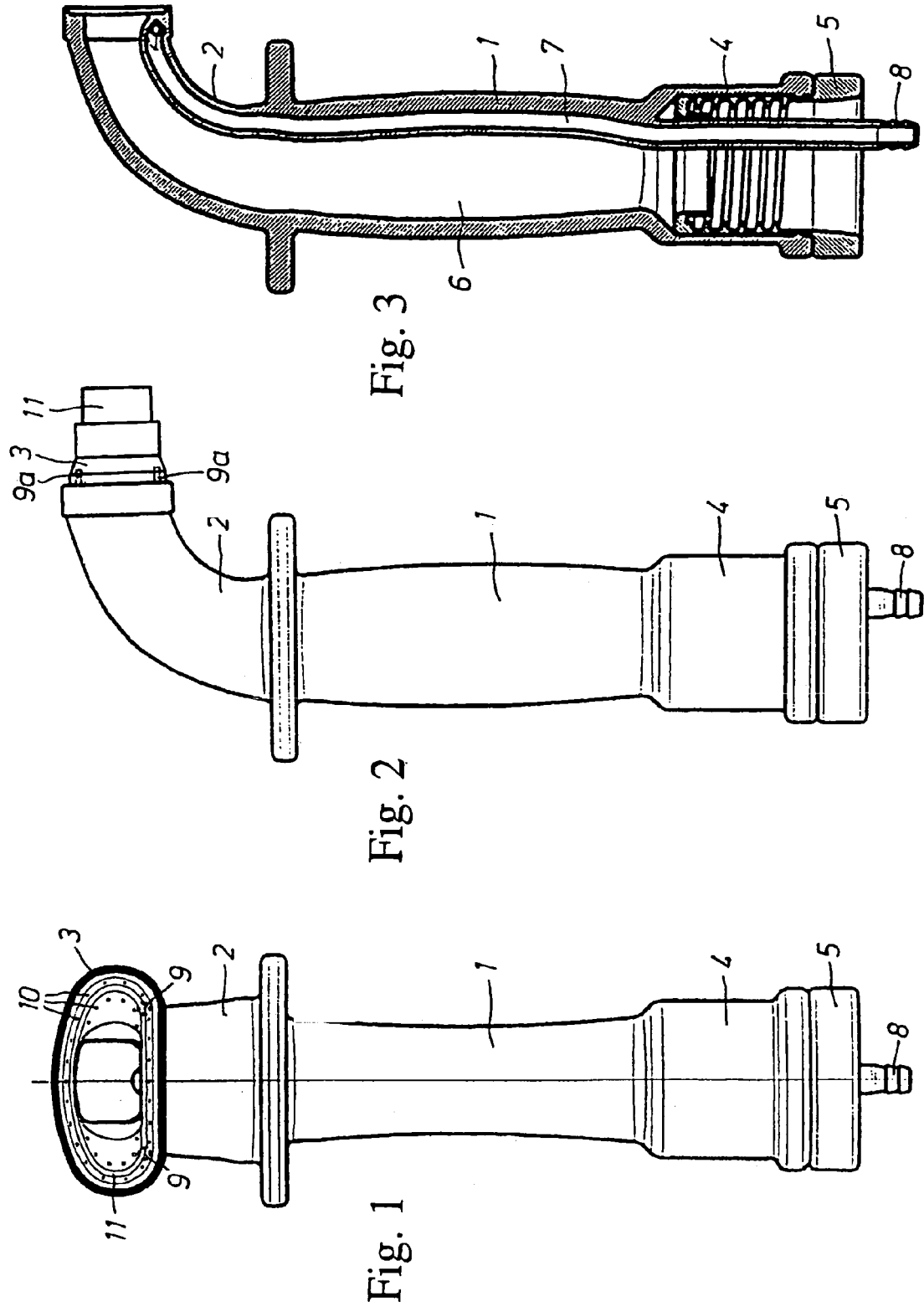

SUCTION HEAD FOR CLEANING OF THE SURFACE OF CARCASS PARTS

REFERENCE TO RELATED APPLICATIONS

This disclosure claims the benefit of International Application No. PCT/DK02/00602, having an international filing date of Sep. 18, 2002, which designated the United States of America, and this disclosure is the United States national stage of that international application. This disclosure further claims priority to Denmark patent application PA-200101400, filed Sep. 26, 2001.

BACKGROUND

1. Field of the Invention

The present invention relates generally to a suction head for cleaning of carcass parts, and, more specifically, to a suction head having an oblong handle and a nozzle mounted on one end of the handle for cleaning the surface of carcass parts.

2. Description of the Existing Art

In slaughtering of animals and evisceration of carcasses, remnants of tissue are left on the surface of the carcasses. These remnants must be removed before the carcass is cut. For this purpose use can be made of equipment with a suction head connected with a suction device. An operator moves the nozzle of the suction head along the surface of the carcass, by which e.g. fat remnants are sucked away from the inside of the carcass and carried down into a container in the suction device.

During the suction process the suction head is in contact with large areas of the carcass, and therefore there is a great risk that any occurrence of pathogens will spread on the carcass. There is also a risk that pathogens will spread to subsequent carcasses, as there is normally no disinfection of the suction head between the treatments of each carcass.

Some known equipment have suction heads that allow a more hygienic cleaning process. In these equipments hot steam is conveyed continuously to the nozzle of the suction head, so that this is disinfected continuously. WO 97/15196 (Jarvis Products Corporation) describes such equipment with steam supply.

EP 0679 335 A1 (Kentmaster) describes other equipments with steam supply. In one embodiment the steam is supplied through an external tube on the nozzle and the suction tube, which leads to the nozzle. The tube is connected to a chamber close to the mouth of the nozzle. The chamber encircles the nozzle and is open in the side closest to the mouth. A grip tube is mounted on the outside of the suction tube and the corresponding section of the steam tube. The grip tube protects the operator against heat from the steam tube section.

The known equipment with steam supply have the drawback that the operation is fatiguing for the operator. Among other things they can be difficult to place in indentations and the operator is in danger burning himself on unprotected steam tube parts.

SUMMARY

The purpose of the invention is to provide an improved suction head with disinfection facility.

The purpose is achieved in the suction head according to the invention, wherein an air duct passes through the handle and the nozzle and can be connected with a suction device via a coupling at the other end of the handle, wherein steam ducts are designed in the nozzle to lead hot steam to the surface parts of the nozzle which are intended to get into contact with the surface of carcass parts, and these steam ducts are connected with a supply duct through a connection, which supply duct is connected with a steam source via a coupling on the suction head, and wherein the supply duct for steam passes through the handle from its coupling end to the suction device and to its nozzle end.

The suction head according to the invention distinguishes itself in that it is easy to operate for the operator, since there is no external steam tube to inconvenience the operator or to prevent the nozzle from accessing indentations in the surface of the carcass. In addition the operator does not risk burning himself on any steam tube. The present design of the suction head also allows for making the suction head light in weight. Therefore, it is much less fatiguing to use the suction head according to the invention than the known suction heads.

The connection from the supply duct at the nozzle end of the handle and to the steam ducts may run inside the suction head.

The supply duct can be connected with the handle in mainly its entire length, so that it lies stationary in the handle.

The supply duct can be integrated with the handle; it can e.g. be designed in the material of the handle as a duct running in the material. In this way loose tubes with bending and connection problems are avoided.

The supply duct passes preferably in the nozzle into the steam ducts. The supply duct can e.g. end in an encircling duct in the nozzle, which serves to connect the supply duct and the steam ducts, and from where the steam passes through openings in the side/sides of the encircling duct to the steam ducts. This enables a simple coupling between the supply duct and the steam ducts with a distribution of the steam to all of the steam ducts.

The supply duct can be branched at the nozzle, and the branches can supply different steam ducts. In this way a more homogeneous distribution of the steam to the steam ducts can be achieved.

The end section of the handle at the nozzle and the supply duct in this can describe a curve away from the longitudinal axis of the handle, preferably an approximate quarter curve. In this way the nozzle can be placed with the opening of the nozzle parallel with the longitudinal direction of the handle without the occurrence of sharp bends in the supply duct, which might spoil the distribution of steam.

The handle can be made of a plastic material and the nozzle of metal. It is advantageous that the handle is made of plastic, because this will provide a certain insulation against the heat from the supply duct and it can be shaped into the desired piece by moulding or the like. It is an advantage that the nozzle is made of metal, such as stainless steel, because the heat from the steam then can spread out over a larger area that is kept at a disinfecting temperature.

The handle with supply duct can be made in one piece, e.g. by "plastic laser-sintering" or molding/pressing.

The suction head according to the invention can be used to remove remnants of fat, (half) loose remnants of tissue and other material from the surface of pig carcasses, in particular from the inside of half pig carcasses. It can also be used on carcasses of other animals, e.g. cattle.

The invention is explained in further detail in the following with reference to the drawing, in which

BRIEF DESCRIPTION OF THE SEVERAL VIEWS OF THE DRAWING

FIG. 1 shows a suction head consisting of a handle and a nozzle, seen from the side, FIG. 2 shows the head of FIG. 1 seen from another side at right angles to the first side, and FIG. 3 shows a longitudinal section through the handle of the head of FIGS. 1 and 2.

DETAILED DESCRIPTION OF PREFERRED EMBODIMENT

The suction head comprises a handle 1, one end of which continues into a curved part 2, on which a nozzle 3 is mounted by means of screws. In the opposite end the handle 1 continues into a connecting part 4, which contains a coupling piece 5 for connection of a hose from a suction device, which sucks air into and through the air duct 6 designed in the nozzle and the handle. The coupling piece is provided with an inside thread, so that the end of the hose can be firmly screwed into the coupling piece, which fits tightly into the connecting part 4 of the handle.

Inside the handle is a supply duct 7 for steam. The duct is designed in one piece with the handle and it has a pipe stub 8, so that the duct can be connected with a steam source by putting a hose on the pipe stub. The duct 7 follows the curved part 2 of the handle, and at the end it is branched into two ducts which flow into two openings 9, which are located opposite the open side of an encircling groove in the nozzle, which fits tightly against a flat mounting surface on the end of the curved part of the handle. Thus, the groove together with the mounting surface of the handle forms a duct 9a. This encircling duct distributes the steam to steam ducts 10, which passes from the duct to the surface of the part 11 of the nozzle which is intended to get into contact with the surface of a carcass part which is to be cleaned. The steam ducts are distributed around the contact part 11, both on the inside and the outside, and they go mainly parallel with its side surfaces, which in operation are swept homogeneously with steam of a high temperature, so that the surfaces are continuously being disinfected.

The way for an operator to use the suction head is to grasp the handle 1 and lead the contact part 11 along and in contact with the surface of the carcass, which is to be cleaned.

Loose parts on the surface of the carcass part, like remnants of leaf fat, are sucked into the nozzle 3, through the handle 1 and the hose, which is fastened in the coupling piece 5, to an accumulation container in the suction device.

It is less fatiguing for an operator to use this suction head than the known suction heads with disinfection facility, among other things because it is very light and because there is no interfering outside steam connection and steam tube, so it is generally more simple to operate and it is easier for the nozzle to access the indentations in the surface of the carcass part. Furthermore, there is no risk that the operator will burn himself because the duct for steam supply is located inside the handle, which is kept cooled by the air that is being sucked through it.

The handle with supply duct is made in one piece by "plastic laser sintering", where the piece is built up layer by layer in the longitudinal direction of the handle by sintering of plastic grains. The nozzle is made of stainless steel by milling.

The invention claimed is:

1. Suction head for cleaning of the surface of carcass parts, which suction head comprises an oblong handle (1) and a nozzle (3) mounted on one end of the handle, wherein an air duct (6) passes through the handle and the nozzle and can be connected with a suction device via a coupling (5) in another end of the handle, wherein steam ducts (10) are designed in the nozzle (3) to lead hot steam to the surface parts (11) of the nozzle adapted to contact the surface of carcass parts, and said steam ducts (10) being connected with a supply duct (7) through a connection (9a), wherein the supply duct (7) for steam passes though the handle (1) from a coupling end to the nozzle.

2. Suction head according to claim 1, wherein the connection (9a) from the supply duct (7) at the nozzle end of the handle (1) and to the steam ducts (10) runs inside the suction head.

3. Suction head according to claim 1, wherein the supply duct (7) is connected with the handle (1) over substantially its entire length.

4. Suction head according to claim 1, wherein the supply duct (7) is integrated with the handle.

5. Suction head according to claim 1, wherein the supply duct (7) ends in an encircling duct in the nozzle (3), connecting the supply duct and the steam ducts, and from where the steam passes through the openings in the side/sides of the encircling duct to the steam duets (10).

6. Suction head according to claim 1, wherein the supply duct (7) is branched at the nozzle (3), and wherein the branches supply different steam ducts (10).

7. Suction head according to claim 1, wherein the end section (2) of the handle at the nozzle and the supply duct (7) describe a curve away from the longitudinal axis of the handle.

8. Suction head assembly according to claim 7, wherein the curve is an approximate quarter curve.

9. Suction head according to claim 1, wherein the handle (1) is made of a plastic material and the nozzle (3) is made of metal.

10. Suction head according to claim 1, wherein the handle with supply duct is made in one piece.

11. Suction head according to claim 10, wherein the handle is made by plastic laser sintering.

* * * * *

UNITED STATES PATENT AND TRADEMARK OFFICE
CERTIFICATE OF CORRECTION

PATENT NO. : 7,166,022 B2 Page 1 of 1
APPLICATION NO. : 10/489761
DATED : January 23, 2007
INVENTOR(S) : Jens J. Soerensen et al.

It is certified that error appears in the above-identified patent and that said Letters Patent is hereby corrected as shown below:

In the Claims:

At Column 4, line 36, Claim 5, "duets" should read -- ducts --.

Signed and Sealed this

Fourteenth Day of August, 2007

JON W. DUDAS
*Director of the United States Patent and Trademark Office*